(12) United States Patent
Tsukamoto

(10) Patent No.: US 7,876,773 B2
(45) Date of Patent: Jan. 25, 2011

(54) METHOD, APPARATUS AND PROGRAM FOR TRANSFERRING DATA

(75) Inventor: Yasushi Tsukamoto, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 12/198,339

(22) Filed: Aug. 26, 2008

(65) Prior Publication Data

US 2009/0067438 A1 Mar. 12, 2009

(30) Foreign Application Priority Data

Sep. 11, 2007 (JP) ............................. 2007-235237

(51) Int. Cl.
*H04L 12/42* (2006.01)
(52) U.S. Cl. .................................................... 370/450
(58) Field of Classification Search ................ None
See application file for complete search history.

(56) References Cited

U.S. PATENT DOCUMENTS 6,028,837 A * 2/2000 Miller ........................ 370/222
6,278,695 B1 * 8/2001 Christensen et al. ........ 370/254
2009/0098898 A1 * 4/2009 Patterson .................... 455/521

FOREIGN PATENT DOCUMENTS

JP 2005-268914 9/2005

OTHER PUBLICATIONS

Journal of Xi'an University of Post and Telecommunications, "A Novel Algorithm of Token Transfer", pp. 7-11, vol. 10, No. 2, English Abstract provided.

* cited by examiner

*Primary Examiner*—Chirag G Shah
*Assistant Examiner*—Otis L Thompson, Jr.
(74) *Attorney, Agent, or Firm*—Douglas A. Lashmit; Hoffman Warnick LLC

(57) ABSTRACT

A method, apparatus, and program for allowing a first transmitting apparatus among a plurality of transmitting apparatuses connected to a network to transmit data packets to the network. The method includes: receiving a control packet transmitted from a second transmitting apparatus among the plurality of transmitting apparatuses, judging whether the received control packet indicates permission for the first transmitting apparatus to transmit data packets, and also, transmitting data packets in response to the judgment that the permission is indicated, or receiving an additional control packet in response to the judgment that the permission is not indicated; and, transmitting a new control packet indicating, as a transmitting apparatus permitted to transmit data packets subsequently, one transmitting apparatus selected by a predetermined rule from the plurality of transmitting apparatuses, on condition that the transmission of the data packet is completed.

14 Claims, 10 Drawing Sheets

METHOD, APPARATUS AND PROGRAM FOR TRANSFERRING DATA

TECHNICAL FIELD

The present invention relates to a method of transferring data in a network. The present invention particularly relates to a data transferring method and apparatus for suppressing data congestion occurring when data are transferred from a plurality of transmitting apparatuses via the same network line.

BACKGROUND ART

It is publicly known that a network using an Internet protocol (IP) as a network protocol (that is, a protocol of a network layer of an OSI reference model) is generally called an IP network, and that the Internet, a local area network (LAN) and the like are types of IP networks.

Application of data transfer techniques utilizing IP networks has led to the provision of various types of real-time applications, such as an IP phone and a TV conference system, using IP packets (i.e., packets which are units of data transfer in the IP network). These real-time applications are made possible by techniques for real-time delivery of audio and image data or the like in a stream format. The real-time delivery techniques include voice over IP (VoIP), data streaming, and the like. Any one of the real-time delivery techniques requires that an allowable number of transferred streams in a network should be made as many as possible.

In these real-time delivery techniques, not a transmission control protocol (TCP) but a user datagram protocol (UDP), with which a higher transfer rate can be expected, is often used as a transfer protocol (that is, a protocol of a transport layer of an OSI reference model).

UDP provides high data transfer rate as compared to TCP, but is a protocol of a non-procedural method where delivery confirmation and the like are not performed, and does not have re-transmission control established therefor. For this reason, only an application or the like that belongs to a higher layer than UDP can detect a packet loss, a data error and the like during a transfer of data, and function as means for handling the detected loss or error, while UDP itself neither covers such detection nor functions as such handling means. For this reason, UDP is used mainly for delivery in which a loss of some data during transfer, if any, is considered as a trivial problem, such as delivery of sounds or images in the stream format. However, when a lost data amount is large, this data loss is no longer ignorable, and brings about deterioration in reliability of transfer. Consequently, in a data transfer using UDP, it is required that the lost data amount should be minimized.

Incidentally, in general, a maximum value for the data amount that can be transferred in one time (that is, in one packet) is determined for a communication network, and this value is called a maximum transmission unit (MTU). This MTU can be set by a transmitting apparatus each time the transmitting apparatus establishes a connection for transferring data. For example, an allowable data transfer amount of a receiving apparatus is restricted even if the transmitting apparatus has a larger allowable data transfer amount than that of the receiving apparatus. Hence, a maximum MTU value that can be set for a connection for transferring data from the transmitting apparatus to the receiving apparatus is the allowable data transfer amount of the receiving apparatus.

In most cases, data subjected to a data transfer in a real-time application are large in total size, like PCM sampling data or moving picture image data, and this size far exceeds an MTU value settable in the transfer. Accordingly, when data is transferred by using the UDP in a real-time application, not only should the data to be transferred be divided into a plurality of UDP packets, but also each of the UDP packets should be further divided into a plurality of small packets (referred to as fragment packets hereinafter) each having an MTU size set for the transfer, and then, those fragment packets should be sequentially transferred.

Normally, this division of each of the UDP packets into the plurality of fragment packets each having an MTP size is performed hardware-wise on the transmitting apparatus by an interface logic on a network card through an operating system (OS) and then a network card driver. Additionally, efficient transfer of the fragment packets is made possible by performing so-called a burst transfer where all of fragment packets corresponding to one UDP packet are transferred intensively and continuously.

In a burst transfer of the fragment packets, a network line is momentarily occupied by data continuously transferred from a transmitting apparatus. In this case, no problem arises if only one transmitting apparatus communicates with only one receiving apparatus. However, suppose a case where a plurality of pairs each consisting of a transmitting apparatus and a receiving apparatus use the same network line. In such a case, competition for the line occurs, and consequently causes so-called congestion if occupancies of the network line are overlapped as a result of synchronization of timings when fragment packets are transmitted from one transmitting apparatus and when fragment packets are transmitted from another transmitting apparatus.

FIG. 1 shows an environment where a burst transfer of a data packet is regularly performed from each of a plurality of transmitting apparatuses connected to an IP network. Data transferred from a transmitting apparatus A 102 to a receiving apparatus A 112, and data transferred from a transmitting apparatus B 104 to a receiving apparatus B 114 are transferred via the same relay HUBs 122 and 124 and the like by using the same IP network line 132.

FIG. 2 shows that, in the environment shown in FIG. 1, data rates (data amounts per unit time) for data transmitted for burst transfers respectively from the transmitting apparatuses A 102 and B 104 change with time.

In FIG. 2, there are overlapping periods 202 and 204 each between a burst transfer from a transmitting apparatus A and a burst transfer from the transmitting apparatus B. In each of these overlapping periods, fragment packets flowing into the IP network line 132 converge for a certain period, and a total data amount that can be allowed to flow thereinto exceeds an allowable transfer amount (also referred to as a network band) per unit time of the network line, so that fragment packets flowing from any one of the transmitting apparatuses are put into a waiting row (a queue, or a buffer) in the HUBs and the like, and thereby go into a state for waiting to be processed.

However, the capacity of a waiting row at each relay router is limited. Accordingly, in the case where packets are too many to be stored altogether in the waiting row, some of the packets waiting to be transferred are discarded, whereby data losses occur. Generally, in a burst transfer, when a loss of one fragment packet occurs, the loss is regarded as a loss of all fragment packets associated with the burst transfer, and results in losing a massive data amount, which is larger than the data amount in the actually discarded packets.

In the case of the example shown in FIG. 2, even though it is apparent that the average of a total data amount of data transfers from the transmitting apparatuses A and B is not more than an allowable transfer amount per unit time of the IP network line 132, an unreasonable result that a very large data amount is lost, as compared to a case where a single transmitting apparatus performs data transfers, in an overlapping period of burst transfers from both of the apparatuses A 102 and B 104.

In order to solve such a problem about data losses resulting from congestion, the following two methods can be considered. Firstly, one of the methods is to make the size of a UDP packet not more than a MTU size set for the transfer of the UDP packet so that the UDP packet cannot be fragmented. When this method is used, each UDP packet is made fragmentary, so that the data amount discarded at the occurrence of a data loss can be suppressed to the minimum.

However, in this method, unlike in a normal case where division of a UDP packet into a plurality of fragment packets is performed hardware-wise at high speed, generation of UDP packets by dividing data to be transferred is performed software-wise by a CPU, so that the CPU requires longer time for generating a large number of UDP packets each having a size not more than a MTU size. At the same time, the receiving apparatus side also requires longer time for reception processing of the UDP packets. Additionally, this method is not configured to highly efficiently transfer, by burst transfer or the like, a large number of UDP packets obtained by dividing data to be transferred, and consequently cannot achieve a sufficient performance as in the case where fragment packets are transferred in bursts.

Another method is to eliminate the necessity to fragment a UDP packet by setting an MTU size to a large value for the transfer of the UDP packet. For example, if the MTU size, usually set to 1500 bytes, is changed to 9000 bytes, the fragmentation can be avoided, whereby a UDP packet of a large size can be transferred without being divided.

However, configurations to which this method can be applied are extremely limited because this method is effective only in a case where a relevant network line is one having a physical standard that enables a high transfer efficiency, such as one supported by a Gigabit Ethernet; and also because it is necessary that all of router, such as a relay HUB and the like, should be ready for such large-size packet transfer.

Additionally, Japanese Patent Application Laid-open Publication No. 2005-268914 describes an invention relating to means and the like in a data generating apparatus capable of securing a certain transmission rate by transmitting data at arbitrary timings. In the data generating apparatus, in a case where there is flow control (control on whether or not data transmission should be allowed) by a transfer apparatus, which is in the upstream to the data generation apparatus, the means and the like can secure a constant data transmission rate by adjusting, inside the data generating apparatus, in accordance with a state of the flow control, a timing of transmitting data to be subsequently transmitted to the transfer apparatus.

However, the invention disclosed in Japanese Patent Application Laid-open Publication No. 2005-268914 is based on the premise that there is flow control by a transfer apparatus, which is in the upstream to each data generating apparatus, that is, the above invention refers to a method for solving the problems by adjusting (that is, speeding up), inside each data generation apparatus, future timings of transmitting data in a case where flow control is exercised from the outside of each data generating apparatus. Thus, the above invention is not configured to solve problems such as a data loss occurring as a result of congestion in data transferred from transmitting apparatuses in an environment as shown in FIG. 1 where: there is no supervisory transfer apparatus for exercising such flow control; and a plurality of transmitting apparatuses are connected directly to an IP network.

SUMMARY OF THE INVENTION

The present invention provides a method and transmitting apparatus for avoiding a massive data amount to be lost due to occurrence of data congestion in a network for data transfer when data are transferred from a plurality of transmitting apparatuses via the same network line, and thereby efficiently transferring the data within the limit of a network band of the network line.

A first aspect of the present invention provides a method for allowing one of a plurality of transmitting apparatuses connected to a network to transmit a group of data packets to a receiving apparatus corresponding to the transmitting apparatus. The method includes: (i) a receiving step where the transmitting apparatus waits for and then receives a control packet broadcasted to the network by another one of the plurality of transmitting apparatuses, the control packet containing a first field and a second field, the first field storing therein an identifier that indicates any one of the plurality of transmitting apparatuses, and the second field storing therein a group of identifiers that indicate all or some of the plurality of transmitting apparatuses; (ii) a step where the transmitting apparatus judges, in response to the reception of the control packet, whether an identifier indicating the transmitting apparatus is stored in the first field contained in the control packet, and then, (a) if the transmitting apparatus judges that the identifier is not stored therein, the transmitting apparatus returns to the receiving step to receive another control packet, or (b) if the transmitting apparatus judges that the identifier is stored therein, the transmitting apparatus waits for when the transmitting apparatus becomes ready to transmit a group of data packets, and then executes a step of transmitting the group of data packets to the corresponding receiving apparatus; (iii) a selecting step where the transmitting apparatus selects one identifier from the group of identifiers stored in the second field, in accordance with a predetermined criterion, in response to completion of the transmission of the group of data packets; (iv) a first broadcasting step where the transmitting apparatus broadcasts a first new control packet to the network in response to the foregoing selection, the first new control packet containing a first field and a second field, the first field storing the selected identifier, and the second field storing the group of identifiers; and (v) a step where the transmitting apparatus returns to the receiving step after the completion of broadcasting of the first new control packet.

Additionally, a second aspect of the present invention provides the method of the first aspect, having the following features. The method further includes: (vi) a step where the transmitting apparatus broadcasts a second new control packet to the network without broadcasting the first new control packet, if the transmitting apparatus receives an additional control packet between the end of the step where it receives a control packet, and the start of the first broadcasting step, the second new control packet containing a first field storing therein the selected identifier, and a second field storing therein a group of identifiers stored in the second field in the additional control packet is stored in the second field; and (vii) a step where the transmitting apparatus returns to the receiving step after the completion of broadcasting of the second new control packet.

Furthermore, a third aspect of the present invention provides the method of the second aspect, having the following features. The method further includes: (viii) a step where the transmitting apparatus judges, in response to the reception of the control packet, whether the identifier indicating the transmitting apparatus is included in the group of identifiers stored in the second field, before judging whether the identifier indicating the transmitting apparatus is stored in the first field, and then, (a) judges whether the identifier indicating the transmitting apparatus is stored in the first field if the transmitting apparatus judges that the identifier is included therein, or (b) broadcasts a third new control packet to the network, if the transmitting apparatus judges that the identifier is thus not included, the third new control packet containing a first field storing therein the identifier stored in the first field contained in the received control packet, and a second field storing therein an updated group of identifiers obtained by adding the identifier of the transmitting apparatus to the foregoing group of identifiers; and (ix) a step where the transmitting apparatus to return to the receiving step after the completion of broadcasting of the third new control packet.

While the summary of the present invention has been described above as a method by which a transmitting apparatus connected to a network transfers data packets, the present invention can also be perceived as an apparatus (that is, a transmitting apparatus) by which the method can be implemented. Furthermore, the present invention can also be perceived as a program (also referred to as a computer program or software) which is stored in a memory or the like in the transmitting apparatus, and is capable of enabling the transmitting apparatus to execute the method.

Note that not all the characteristics necessary to the present invention are listed in the above-described summary of the invention, and that a combination or sub-combination of these components can also be an invention.

According to the present invention, when data are transferred from a plurality of transmitting apparatuses connected to a network, congestion resulting from overlapping of data transferred from the respective transmitting apparatuses is avoided by adjusting timings at which data are transmitted from the respective transmitting apparatuses, whereby data transferred from the respective transmitting apparatuses can be prevented from being lost.

Additionally, according to the present invention, a special apparatus bearing supervisory characteristics for adjusting timings at which data are transmitted is not necessary, and timings at which data are transmitted can be adjusted by subjective judgments of the respective transmitting apparatuses only with exchanges of control information among the transmitting apparatuses.

BRIEF DESCRIPTION OF THE INVENTION

These and other features will be more readily understood from the following detailed description of the various aspects of the invention taken in conjunction with the accompanying drawings.

DETAILED DESCRIPTION OF THE INVENTION

Figure 1:
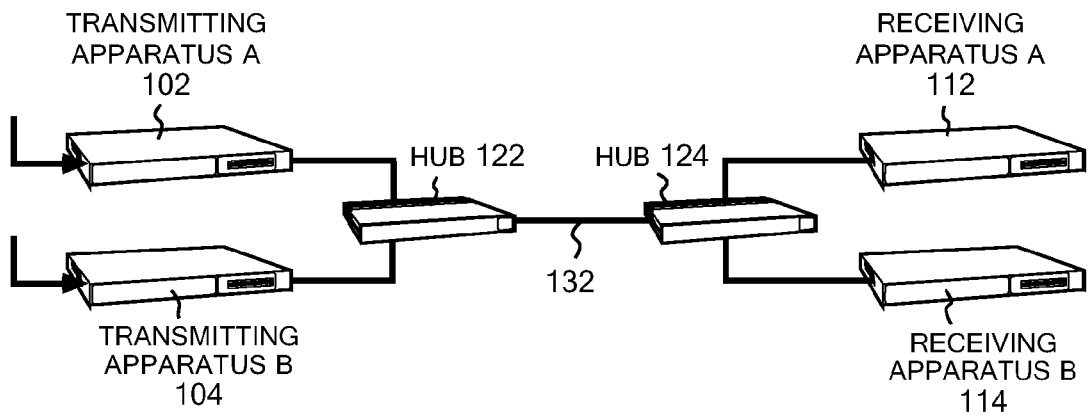
FIG. 1 shows an environment where a plurality of transfer streams are regularly transferred in bursts from a plurality of transmitting apparatuses in the same network.
Figure 2:
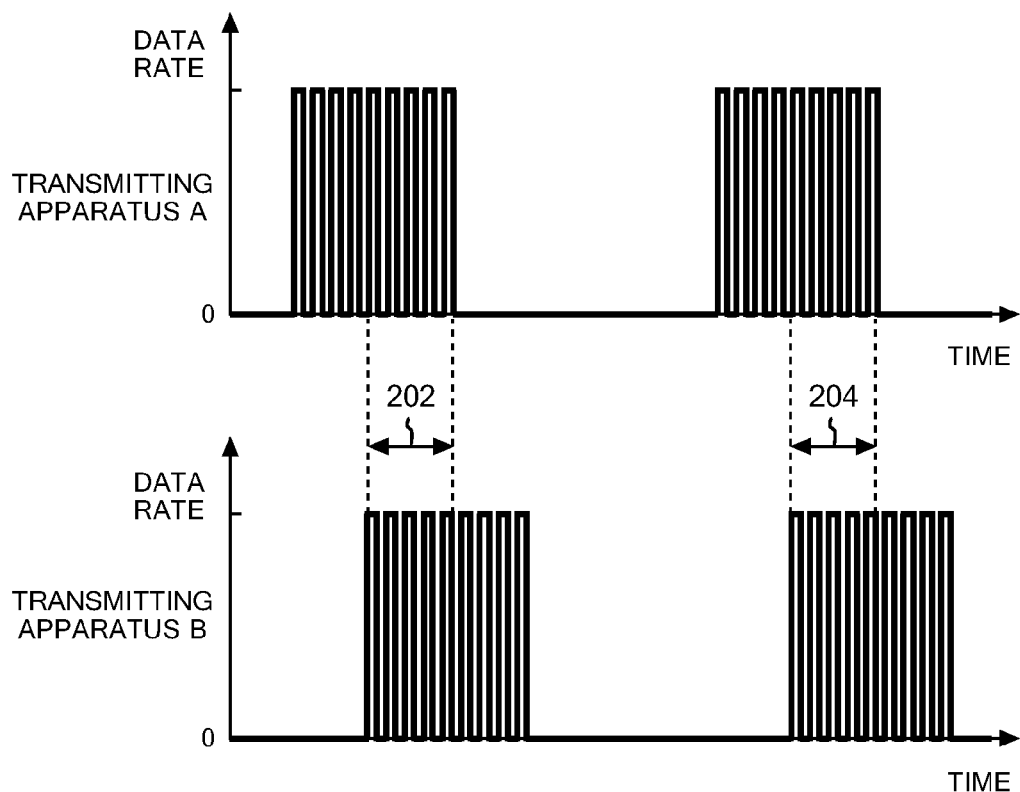
FIG. 2 shows changes in data rate of data transferred from each of the transmitting apparatuses in the data transfer environment shown in FIG. 1.

Hereinafter, by referring to the accompanying drawings, embodiments for carrying out the present invention will be described in detail. Note that the same reference numerals are given to the same elements throughout the entire description of the embodiments.

Figure 3:
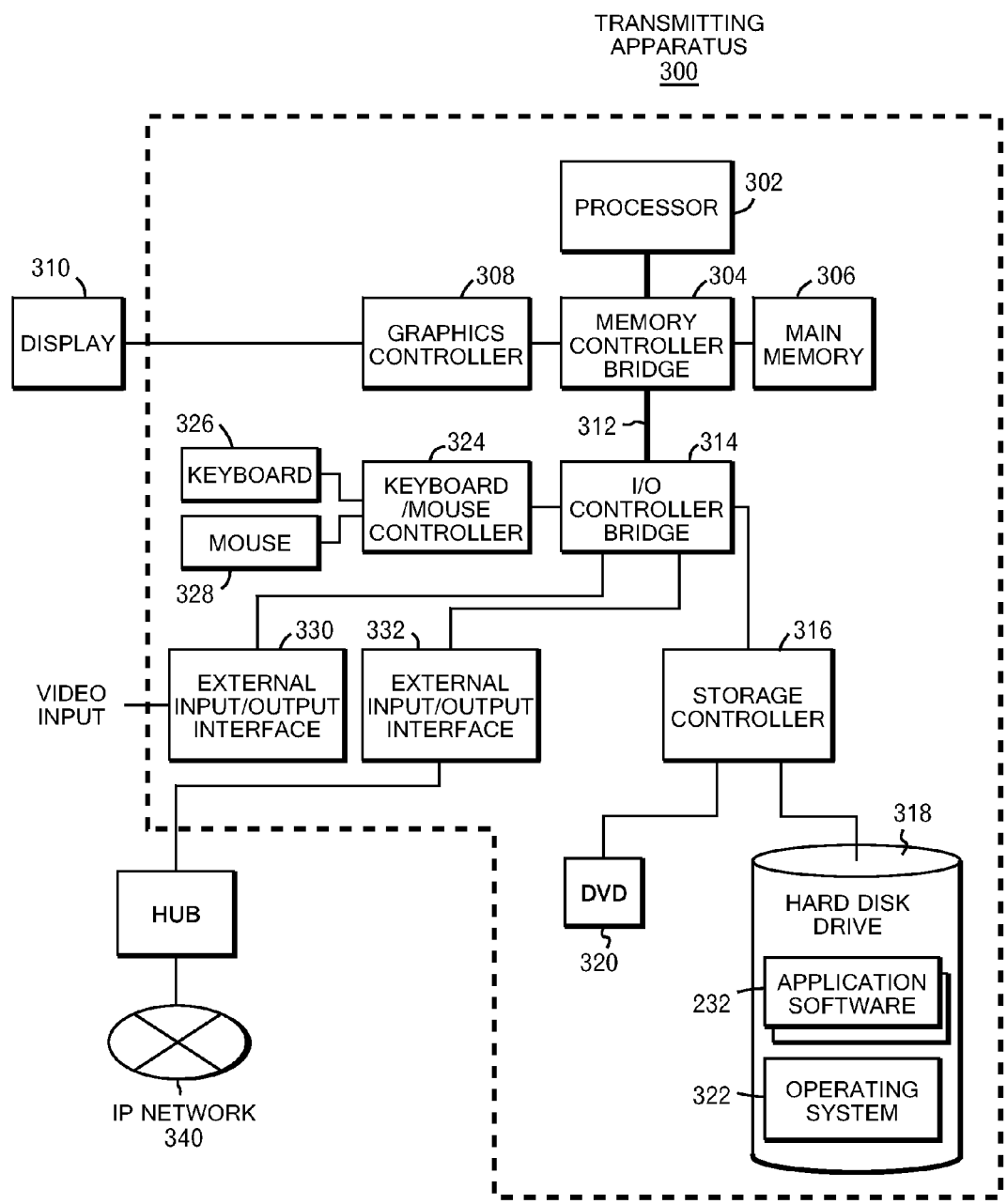
FIG. 3 shows a representative example of a detailed hardware configuration of a transmitting apparatus suitable for implementing the present invention.

FIG. 3 shows a typical example of a detailed hardware configuration of a transmitting apparatus 300 suitable for carrying out the present invention in a system environment where, in the IP network 132 shown in FIG. 1, a burst transfer is regularly performed from each of a plurality of transmitting apparatuses to a corresponding receiving apparatus.

Control over the entirety of the transmitting apparatus 300 is governed by a processor 302 (also called a central processing unit, a CPU, a main processor or the like). A memory controller bridge 304 (also called a memory bridge, a first bridge, a north bridge or the like) is connected to the processor 302 while being placed just proximally thereto; a main memory 306 (also called a memory, a main storage or the like) and a graphics controller 308 are connected directly to the memory controller bridge 304; and a display 310 (also called a display apparatus, display device or the like) is connected to the graphics controller 308.

An I/O controller bridge (also called an I/O bridge, a second bridge, a south bridge or the like) 314 is also connected to the memory controller bridge 304 via a bus such as a PCI local bus 312.

Mass storage devices such as a hard disk drive 318 (also called a HDD, a hard disk, a hard disk storage, a fixed storage device or the like) and a DVD 320 are connected to the I/O controller bridge 314 through a storage controller 316 (an IDE controller, an SCSI controller or the like). These storage devices can store an operating system 322, necessary for carrying out the present invention, and computer programs such as application software 232 for giving the processor and the like instructions to carry out the present invention, in cooperation with the operating system. These computer programs are executed by being loaded into the main memory 306. Additionally, each of these computer programs can be compressed, or can be recorded in a plurality of recording media after being divided into a plurality of parts.

A keyboard/mouse controller 324 is also connected to the I/O controller bridge 314, whereby the I/O controller 314 accepts inputs from input devices such as a keyboard 326 and a mouse 328. In addition, various external input/output interfaces 330 and 332 are also connected to the I/O controller bridge 314.

The external input/output interface 332 is a network adapter, and is connected to an IP network 340 through which data packets according to the present invention are transferred. The external input/output interface 332 has functions of: dividing, further into fragment packets, a data packet (that is, a UDP packet) that should be transferred; and transmitting fragment packets, which are obtained by dividing each data packets, to the IP network 340 by burst transfer.

The external input/output interface 330 is an external source signal input adapter, and has a function, for example, of receiving video signals or the like from an external apparatus (for example, a video camera, a video recorder/player or the like) outside the transmitting apparatus 300, and converting the signals into digital signals that can be processed inside the transmitting apparatus 300, the video signals or the like being to serve as a source of data that should be transferred to the IP network 340 in accordance with the method according to the present invention.

Note that any one of operating systems supporting a graphical user interface (GUI) can be adopted as the operating system 322 which is stored in a mass storage device and governs overall operations thereof.

As has been described above, the transmitting apparatus 300 suitable for carrying out the present invention can be made by an apparatus based on such a general PC architecture that composes a server computer, a client computer or the like. However, each of the components, shown in FIG. 3, that compose the transmitting apparatus 300 is exemplification, and not all of the components are essential components of the present invention.

Additionally, it is obvious that the transmitting apparatus 300 is not necessarily be based on a general PC architecture and can be implemented in various modified configurations as long as having functions equivalent to those capable of carrying out the present invention as a transmitting apparatus, the various modified configurations including a configuration where the transmitting apparatus 300 is composed of a dedicated hardware apparatus. Such modifications naturally are concepts included in the ideas of the present invention.

Under the system environment described above, the embodiments of the present invention will be described below.

Figure 4:
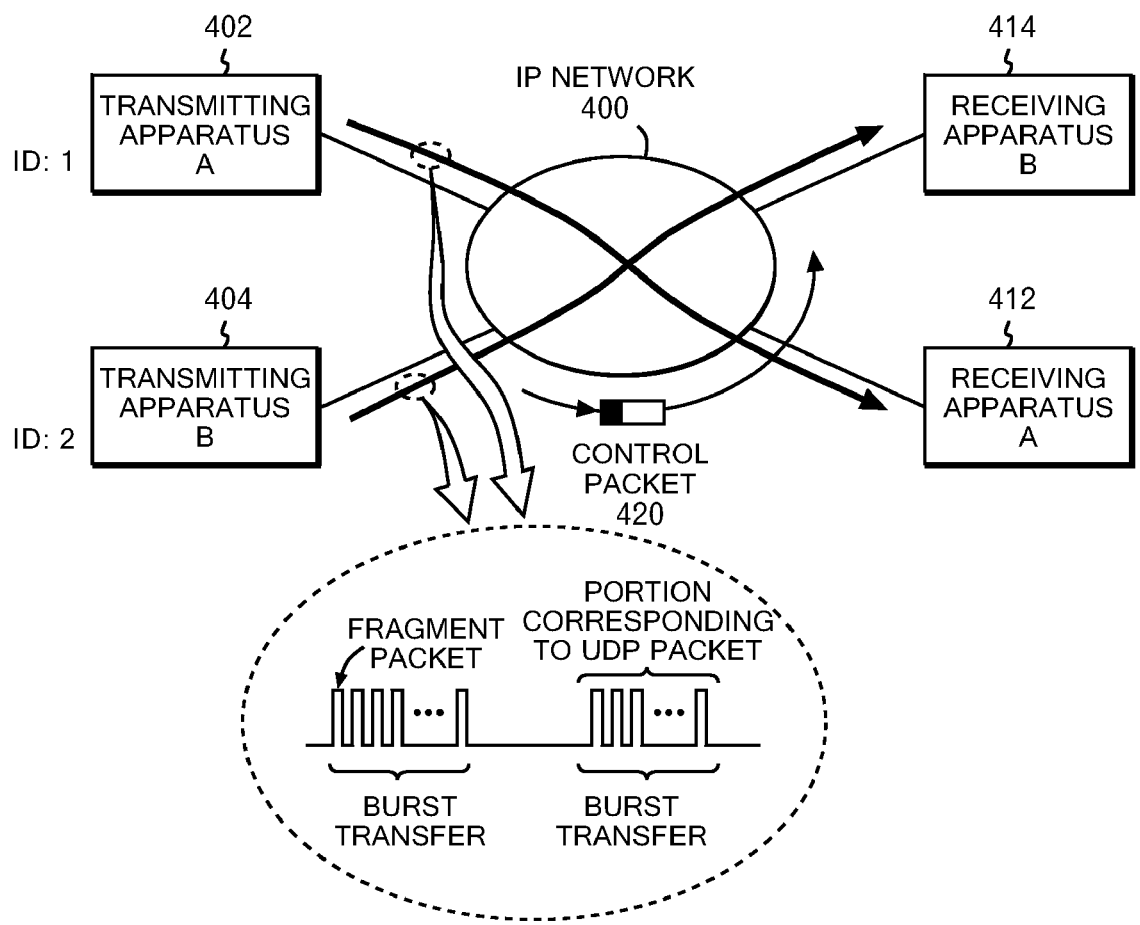
FIG. 4 illustrates a concept according to which data packets from a plurality of transmitting apparatuses connected to an IP network are transferred in bursts on the basis of first and second embodiments of the present invention.
Figure 5:
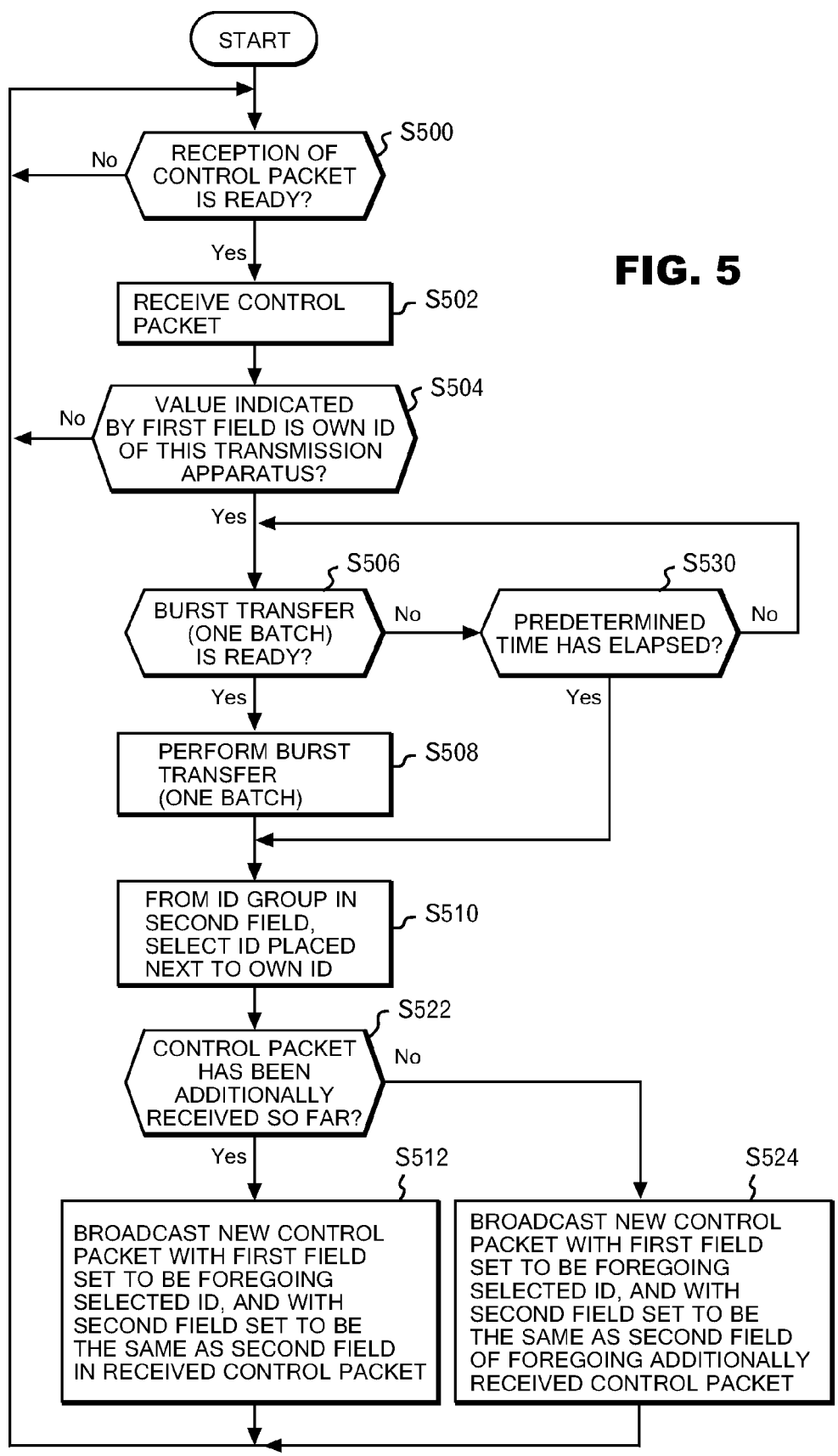
FIG. 5 shows a flow of a procedure according to the first and second embodiments of the present invention in each of the transmitting apparatuses.

FIG. 4 illustrates a concept according to which burst transfers of data packets are performed, on the basis of the first embodiment of the present invention, from a plurality of transmitting apparatuses connected to an IP network. Additionally, FIG. 5 shows a flow of a procedure according to the first embodiment of the present invention in each of the transmitting apparatuses.

In each of the transmitting apparatuses, data that should be transferred is firstly divided into units of UDP packets. Each of the UDP packets is further divided into a plurality of fragment packets each having an MTU size, and a group of fragment packets associated with one UDP packet is continuously transmitted from the transmitting apparatus by burst transfer at one time. Each of the transmitting apparatuses repeatedly performs this burst transfer for each of the groups of fragment packets, the groups respectively having fragment packets which correspond, in number, to the respective UDP packets.

FIG. 4 illustrates that only two apparatuses, a transmitting apparatus A 402 and a transmitting apparatus B 404 both connected to an IP network 400, are operating as apparatuses that actually transfer data packets in bursts. The present invention can be carried out in each of these transmitting apparatuses A 402 and B 404. That is, even in a case where there is a different apparatus physically connected to the IP network 400, the present invention is not carried out in the different apparatus if the different apparatus is not operating as an apparatus that actually transfers data packets in bursts.

To each of apparatuses, including the respective transmitting apparatuses, connected to the IP network 400, an ID (also referred to as an identifier) uniquely determined inside the network is assigned. While there exists an IP address as a typical example of this ID, an ID in any form is applicable as long as the ID is uniquely determined inside an applicable network. In the following description, it will be supposed that each of the IDs is expressed as a decimal number. In the example of FIG. 4, an ID for the transmitting apparatus A 402 is "1," and an ID for the transmitting apparatus B 404 is "2."

To the IP network 400, a control packet 420 for adjusting timings at which burst transfers are respectively started is broadcast from any one of the transmitting apparatuses A 402 and B 404. That is, the control packet 420 is transmitted to the IP network 400 while having, as a destination address, a broadcast address with which the control packet 420 can be received by any apparatus connected to the IP network 400.

Figure 6:
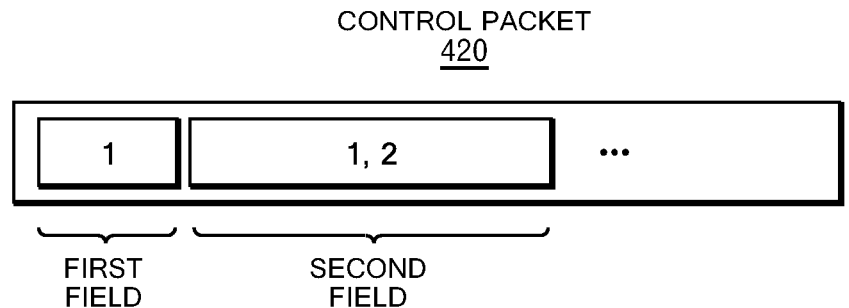
FIG. 6 shows an example of a format of a control packet broadcast to an IP network 400.

FIG. 6 shows an example of a format of the control packet 420 broadcast to the IP network 400. The control packet 420 is provided with at least two information fields, which are a first field and a second field.

While one ID assigned to any one of the transmitting apparatuses connected to the IP network 400 is stored in the first field, an ID group consisting of IDs assigned to one or a plurality of transmitting apparatuses connected to the IP network 400 is stored in the second field.

Operations in which each of the transmitting apparatuses A 402 and B 404 performs a burst transfer of data packets on the basis of the first embodiment of the present invention will be described below in accordance with the procedure shown in FIG. 5.

The transmitting apparatus A firstly waits for when a control packet broadcast to the IP network 400 is ready to be received (step S500). Then, the transmitting apparatus A receives the control packet (step S502) after the reception has become possible.

Subsequently, the transmitting apparatus A checks a first field of the thus received control packet, and judges whether a value indicated by the first field is the ID (that is, "1") of the transmitting apparatus A itself (step S504).

This first field is understood as indicating a transmitting apparatus desired to transfer a data packet in bursts subsequently. Accordingly, if the value indicated by the first field is not the ID of the transmitting apparatus A itself, the transmitting apparatus A receives an instruction indicating that the transmitting apparatus A cannot transfer the data packet in bursts this time with the received control packet. Consequently, the transmitting apparatus A performs nothing, and returns to the step of waiting for when an additional control packet becomes ready to be received (step S500).

On the other hand, if the value indicated by the first field is the ID of the transmitting apparatus A itself, the transmitting apparatus A has received an instruction indicating that the transmitting apparatus A can transfer the data packets in bursts this time with the received control packet. Then, the transmitting apparatus A waits for when it becomes possible for the transmitting apparatus A to transfer a batch of data packets in bursts (step S506). After the transfer has become possible at the completion of preparation for the burst transfer, the batch of data packets are actually transferred in bursts (step S508).

After the completion of transferring the batch in bursts, to determine a transmitting apparatus desired to transfer the data packets in bursts subsequently, an ID placed next to the ID of the transmitting apparatus A is selected from the ID group stored in the second field in the received control packet. In a case where the ID of the transmitting apparatus A is placed at the end of the ID group, the selection returns to the beginning thereof in a round-robin fashion, whereby an ID placed at the beginning of the ID group is selected (step S510). A different manner may be adopted as how to select an ID. An apparatus associated with an ID thus selected is an apparatus desired to transfer the data packets in bursts subsequently.

However, for some reason or other, in some cases, it takes a long time before burst transfer of one batch becomes possible in the transmitting apparatus A. Such cases are not favorable in that, if the transmitting apparatus A indefinitely waits for when the burst transfer becomes possible, data transfer efficiency of the entirety of transmitting apparatuses connected to the IP network 400 is lowered because processing is interrupted in this step. In order to avoid such a situation, if the burst transfer has not become possible even when a predetermined time has passed since the transmitting apparatus A started waiting for when the burst transfer becomes possible, the transmitting apparatus A can be enabled, as time-out processing, to skip the burst transfer to proceed to the step of selecting a transmitting apparatus desired to perform a burst transfer (step S530).

After the selection, the transmitting apparatus A broadcasts, to the IP network 400, a first new control packet generated by the transmitting apparatus A itself in conformity to the format of the foregoing control packet. While the selected ID is stored in a first field in this first new control packet, the same content as is in the ID group indicated in the second field in the received control packet are stored in a second field therein (step S512).

After broadcasting this first new control packet, the transmitting apparatus A returns to the step of waiting for when reception thereby of an additional control packet becomes possible (step S500).

The same procedure as described above is also executed with respect to the transmitting apparatus B.

Figure 7:
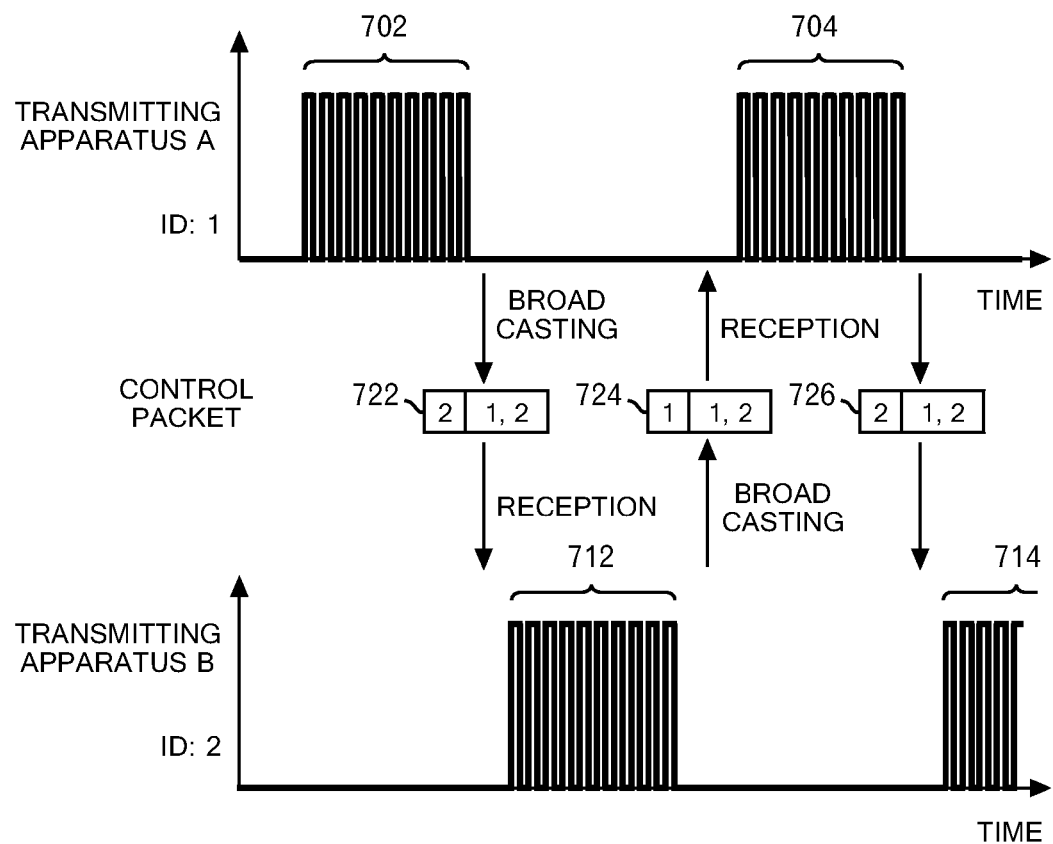
FIG. 7 illustrates at which timings the respective transmitting apparatuses performs burst transfers by coordinating with each other, on the basis of the first embodiment of the present invention.

FIG. 7 illustrates at which timings burst transfers by the respective transmitting apparatuses A and B, coordinating with each other, are performed as a result of executing, on the basis of the first embodiment of the present invention, the procedure shown in FIG. 5 in the data transfer environment shown in FIG. 4.

When a burst transfer 702 of one batch by the transmitting apparatus A ends, a new control packet 722 is broadcast to the IP network while indicating "2," which is the ID for the transmitting apparatus B, in a first field therein.

This control packet 722 is transmitted having a broadcast address as a destination address thereof, and thus can be received by both of the transmitting apparatuses A and B. The transmitting apparatus A performs nothing, and immediately returns to the step of waiting for reception of an additional control packet because the first field in the received control packet 722 is not "1," which is the ID of the transmitting apparatus A itself.

However, the transmitting apparatus B executes a series of processing steps for transferring data packets in bursts because the first field in the received control packet 722 indicates "2," which is the ID of the transmitting apparatus B itself.

When a burst transfer 712 of one batch by the transmitting apparatus B ends, "1" placed next to "2" indicated by the first field is selected from the ID group, "1" and "2," of the second field in accordance with the round-robin order, and a new control packet 724 with this "1" being indicated in a first field therein is broadcast to the IP network.

This time, the transmitting apparatus B having received this control packet 724 performs nothing, and immediately returns to the step of waiting for reception of an additional control packet, because the first field therein is not "2," which is the ID of the transmitting apparatus B itself. On the other hand, the transmitting apparatus A having received the control packets 724 executes a series of processing for transferring data packets in bursts because the first field therein indicates "1," which is the ID of the transmitting apparatus A itself.

When a burst transfer 704 of one batch by the transmitting apparatus A ends, "2" placed next to "1" indicated by the first field is selected from the ID group, "1" and "2," of the second field in accordance with the round-robin order, and a new control packet 726 with this "2" being indicated in a first field therein is broadcast to the IP network.

Thereafter, the same operations are repeated.

Thereby, a burst transfer from the transmitting apparatus A and a burst transfer from the transmitting apparatus B can be performed without overlapping each other.

Next, a second embodiment of the present invention will be described.

In a case where, in the above described first embodiment, an applicable transmitting apparatus receives an additional control packet (step S522) during a period after receiving a control packet (step S502) and before starting to broadcast a new control packet, the transmitting apparatus does not broadcast the first new control packet, but broadcasts a second new control packet in which a content of a second field in the thus received additional control packet is reflected.

That is, while the selected ID is stored in a first field in this second new control packet, the same content as is in the ID group indicated in the second field in the thus received additional control packet is stored in a second field therein (step S524).

This is an embodiment for handling a case where, before a series of processing steps with respect to a control packet received by the applicable transmitting apparatus is completed, another control packet is broadcast from any transmitting apparatus, and is inevitably received by the applicable transmitting apparatus. Besides, this embodiment is a precondition in implementing a later described third embodiment.

Next, the third embodiment of the present invention will be described.

Figure 8:
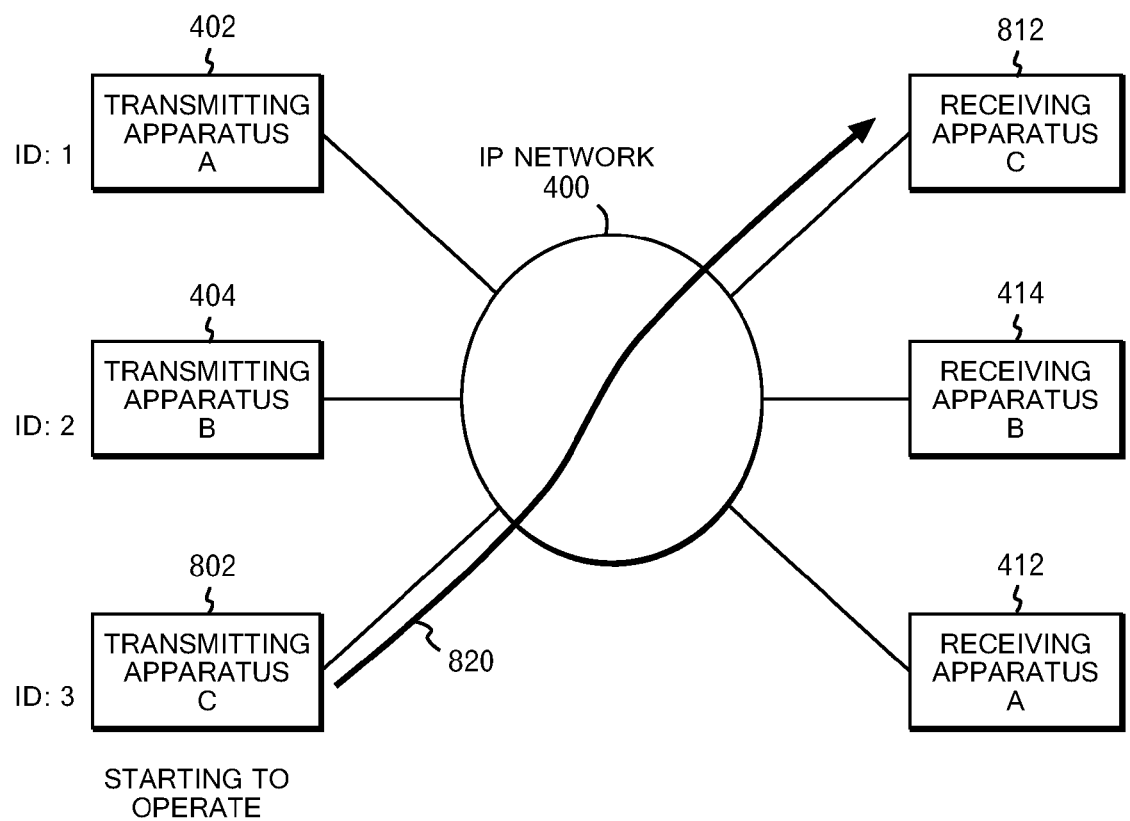
FIG. 8 illustrates a concept according to which data packets from a plurality of transmitting apparatuses connected to an IP network are transferred in bursts, on the basis of third and fourth embodiments of the present invention.
Figure 9:
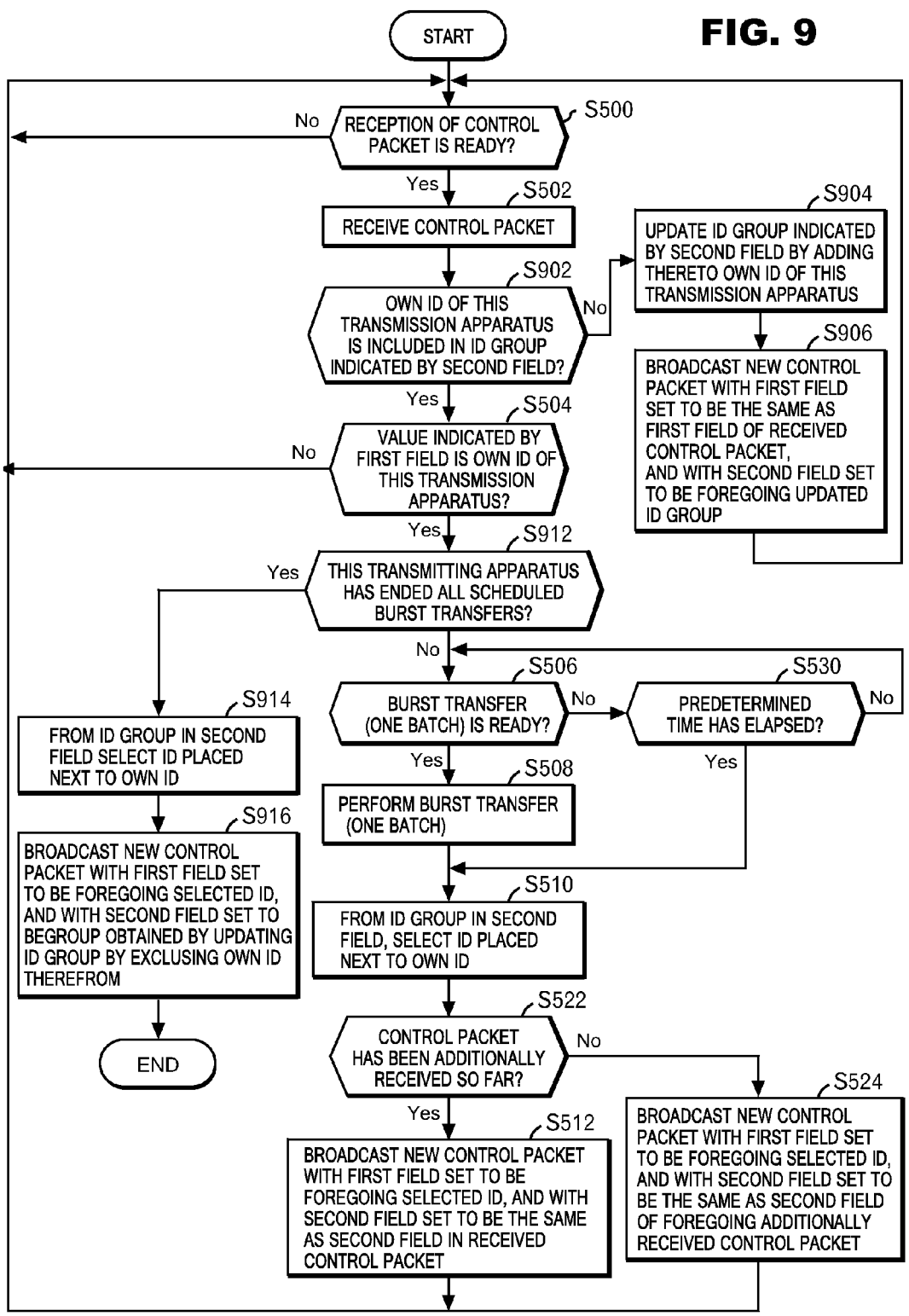
FIG. 9 shows a flow of a procedure according to the third and fourth embodiments of the present invention in each of the transmitting apparatuses.

FIG. 8 illustrates a concept according to which data packets from a plurality of transmitting apparatuses connected an IP network are transferred in bursts on the basis of the third embodiment of the present invention. Additionally, FIG. 9 shows a flow of a procedure, in each of the transmitting apparatuses, according to the third embodiment of the present invention.

FIG. 8 illustrates that, when only two apparatuses, the transmitting apparatus A 402 and a transmitting apparatus B 412 both connected to the IP network 400, are operating as apparatuses that actually perform burst transfers of data packets, a transmitting apparatus C 802 newly starts to operate as an apparatus that performs a burst transfer 820 of data packets to a receiving apparatus C 812. The third embodiment of the present invention is also applicable to the transmitting apparatus C 802 that has newly started to operate in this manner. In FIG. 8, the ID for the transmitting apparatus C 812 is "3."

On the basis of the third embodiment of the present invention, operations in the transmitting apparatus C 812 will be described below in accordance with the procedure shown in FIG. 9.

Firstly, as in the case with the first embodiment, the transmitting apparatus C waits for when a control packet broadcast to the IP network 400 becomes ready to be received (step S500). Then, the transmitting apparatus C receives the control packet (step S502) after the reception has become possible.

Then, before checking a first field in the thus received control packet, the transmitting apparatus C checks a second field in the packet, and then judges whether the ID (that is, "3") of the transmitting apparatus C itself is contained in the ID group indicated by the second field (step S902).

This second field is understood as indicating a group of apparatuses currently operating as transmitting apparatuses that perform burst transfers of data packets. Accordingly, if the ID of the transmitting apparatus C itself is contained in the ID group indicated by the second field, it means that the transmitting apparatus C is also recognized, by other transmitting apparatuses which broadcast control packets, as currently operating as an apparatus that performs a burst transfer. Hence, subsequent operations are the same as those in the case of the first embodiment. That is, in this case, the transmitting apparatus C checks the first field, and then judges whether a value indicated by the first field is the ID of the transmitting apparatus C itself (step S504).

On the other hand, if the ID of the transmitting apparatus C itself is not contained in the ID group indicated by the second field, it means that, as the transmitting apparatus C has just started to operate as an apparatus that transfers data packets in bursts, the transmitting apparatus C has not yet been recognized, by the other transmitting apparatuses, as operating as an apparatus that performs a burst transfer. Hence, in this case, information on a group of transmitting apparatuses operating as transmitting apparatuses that perform burst transfers should be updated, the group being indicated by a second field in a control packet broadcast thereafter. That is, the ID group indicated by the second field in the received control packet is updated by adding the ID of the transmitting apparatus C itself to that ID group (step S904).

Then, the transmitting apparatus C broadcasts to the IP network 400 a third new control packet having been generated based on this updated ID group by the transmitting apparatus C itself. While the same content as the ID indicated by the first field in the received control packet is stored in a first field in this third new control packet, the updated ID group is stored in a second field therein (step S906).

With the broadcasting of this third new control packet, each of the other transmitting apparatuses checks the second field therein when having received the third new control packet. Thereby, the each can recognize that the transmitting apparatus C has been added to the group of transmitting apparatuses operating as apparatuses that perform burst transfers.

After broadcasting this third new control packet, the transmitting apparatus C returns to the step of waiting for when an additional control packet becomes ready to be received (step S500).

Note that, with respect to the transmitting apparatuses A and B already having been operating as transmitting apparatuses that perform burst transfers, in a case where the procedure shown in FIG. 9 is executed, subsequent operations are the same as those in the case of the first embodiment because the IDs of these transmitting apparatuses themselves must be contained in an ID group indicated by the second field.

Figure 10:
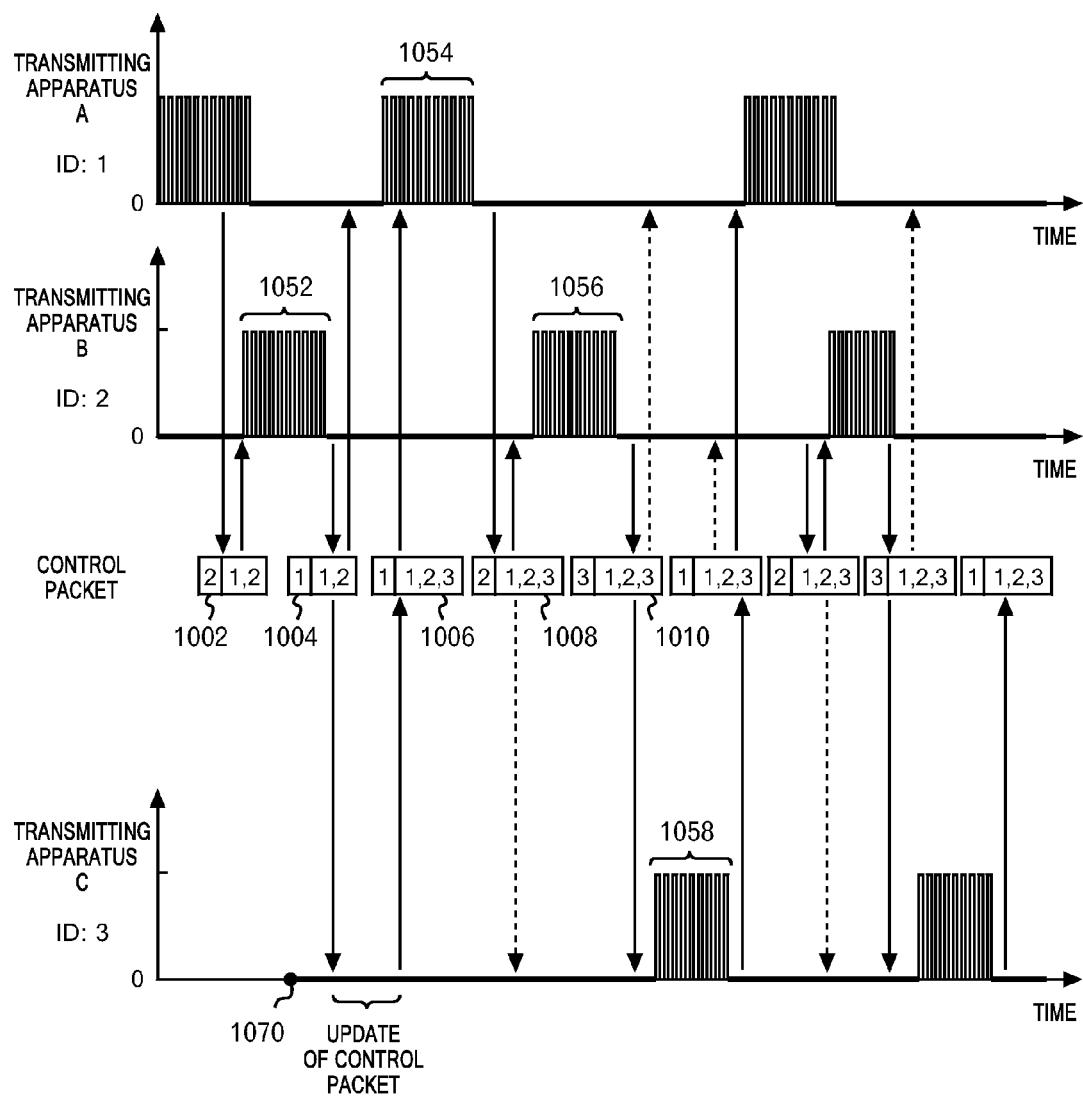
FIG. 10 illustrates at which timings the respective transmitting apparatuses perform burst transfers by coordinating with each other, on the basis of the third embodiment of the present invention.

FIG. 10 illustrates at which timings burst transfers are performed by the respective transmitting apparatuses A, B and C coordinating with each other as a result of executing the procedure shown in FIG. 9, on the basis of the third embodiment of the present invention, in an environment shown in FIG. 8 where the transmitting apparatus C newly operates as an apparatus that performs a burst transfer.

From the transmitting apparatus A, a new control packet 1002 is broadcast to the IP network with "2," which is the ID of the transmitting apparatus B, being indicated in a first field in the packet. Because the first field indicates "2" which is the ID of the transmitting apparatus B itself, the transmitting apparatus B having received the control packet 1002 executes a series of processing steps for performing a burst transfer of data packets.

On the other hand, at a time 1070 in the middle of when a burst transfer 1052 from the transmitting apparatus B is being performed, the transmitting apparatus C starts to operate as a transmitting apparatus that performs a burst transfer.

When the burst transfer 1052 of one batch by the transmitting apparatus B ends, a new control packet 1004 is broadcast to the IP network after the ID indicated by the first field is changed to "1."

This control packet 1004 is received by both of the transmitting apparatuses A and B, and is received at the same time also by the transmitting apparatus C having newly started to execute the procedure shown in FIG. 9.

Since the transmitting apparatus C having received the control packet 1004 judges that "3," which is the ID of the transmitting apparatus C itself, is not contained in a second field thereof, the transmitting apparatus C updates the second field by adding "3" thereto, and then broadcasts a new control packet 1006 to the IP network.

The transmitting apparatus A having received the control packet 1004 executes a series of processing steps for performing a burst transfer of data packets because a first field therein indicates "1," which is the ID of the transmitting apparatus A itself. Under ordinary circumstances, after finishing the burst transfer, the transmitting apparatus A is supposed to broadcast a new control packet after changing the ID indicated by the first field to "2." On this occasion, however, before broadcasting the new control packet, the transmitting apparatus A receives, as an additional control packet, the control packet 1006 having been broadcast by the transmitting apparatus C. Accordingly, in accordance with the procedure (that is, step S524) in the above described second embodiment included in the third embodiment, the transmitting apparatus A updates, on the basis of a content indicated by the second field of the received control packet 1006, an ID group indicated in the second field to "1, 2 and 3," and then broadcasts a new control packet 1008 to the IP network.

The transmitting apparatus B having received the control packet 1008 executes a series of processing steps for performing a burst transfer of data packets because a first field therein indicates "2," which is the ID of the transmitting apparatus B itself. When a burst transfer 1056 of one batch ends, "3" next to "2" indicated by the first field is selected in accordance with the round-robin order from the ID group, "1," "2" and "3," of the second field updated as a result of the operation of the transmitting apparatus C, and a new control packet 1010 is broadcast to the IP network with this "3" being indicated in a first field therein.

Although all of the transmitting apparatuses A to C receive the control packet 1010, only the transmitting apparatus C executes a series of processing steps for performing a burst transfer of data packets because the first field therein indicates "3," which is the ID of the transmitting apparatus C itself.

Thereafter, according to the same procedure as that in the above described first embodiment included in the third embodiment, a burst transfer is repeated cyclically at the transmitting apparatus A, then at the transmitting apparatus B, then at the transmitting apparatus C, then at the transmitting apparatus A and so on, whereby burst transfers from the transmitting apparatuses A, B and C can be performed without overlapping with one another.

That is, while a cycle loop where a burst transfer is repeated at the transmitting apparatus A, then at the transmitting apparatus B, then at the transmitting apparatus A and so on is being executed in the beginning, the cyclic loop is smoothly updated according to the third embodiment of the present invention in a manner that the transmitting apparatus C having started to newly operate in the middle of the cyclic loop breaks in on this cyclic loop.

As has been described above, the third embodiment of the present invention is configured to handle a case where one transmitting apparatus starts to newly operate as an apparatus that performs a burst transfer. A fourth embodiment, which is an extended form of this third embodiment of the present invention, makes it possible to handle a case where one transmitting apparatus having been operated so far as an apparatus that performs a burst transfer finishes repetition of burst transfer, and stops operating.

In the first or third embodiment, a transmitting apparatus which is subject to the embodiment checks a first field of a received control packet, and judges whether a value indicated by the first field is the ID of the transmitting apparatus itself (step S504).

In the fourth embodiment, if it has been judged that the value indicated by the first field is the ID of the transmitting apparatus itself, the transmitting apparatus judges whether all of burst transfers having been scheduled to be performed by the transmitting apparatus are ended (step S912).

This judgment as to whether all of the burst transfers have been ended can be easily implemented, for example, by previously performing programming so that the transmitting apparatus can perform burst transfers of a predetermined number of batches. Additionally, in a case where an instruction to finish performing burst transfers of data packets is given (that is, a value of a certain status or flag inside the transmitting apparatus changes) with a command by a user of the transmitting apparatus or with an input from an external apparatus, the instruction can be implemented by having a program in the transmitting apparatus (to be precise, a CPU and the like executed by that program) monitor the instruction.

If it is judged that the transmitting apparatus has ended all of the burst transfers, in order to determine a transmitting apparatus desired to transfer data packets in bursts, the transmitting apparatus selects an ID, in accordance with the round-robin order, from an ID group indicated by a second field in the received data packet, the ID being located next to the ID of the transmitting apparatus itself (step S914).

If it is judged that the transmitting apparatus has ended all of the burst transfers, there is no need to include the transmitting apparatus in a group desired to cyclically perform a burst transfer. Hence, the transmitting apparatus updates the ID group by eliminating the ID of the transmitting apparatus itself from the ID group indicated by the second field in the received control packet, and broadcasts, to the IP network 400, a fourth new control packet generated by itself on the basis of this updated ID group. In other words, while the foregoing selected ID is stored in a first field in this fourth new control packet, the foregoing updated ID group is stored in a second field therein (step S916).

With the broadcasting of this fourth new control packet, each of other transmitting apparatuses checks the second field therein when having received the fourth new control packets. Thereby, the each can recognize that the transmitting apparatus C has been excluded from a group of transmitting apparatuses operating as transmitting apparatuses that perform burst transfers.

A procedure, according to the fourth embodiment of the present invention, in the transmitting apparatus ends after broadcasting this fourth new control packet.

Finally, the fifth embodiment of the present invention will be described.

Figure 11:
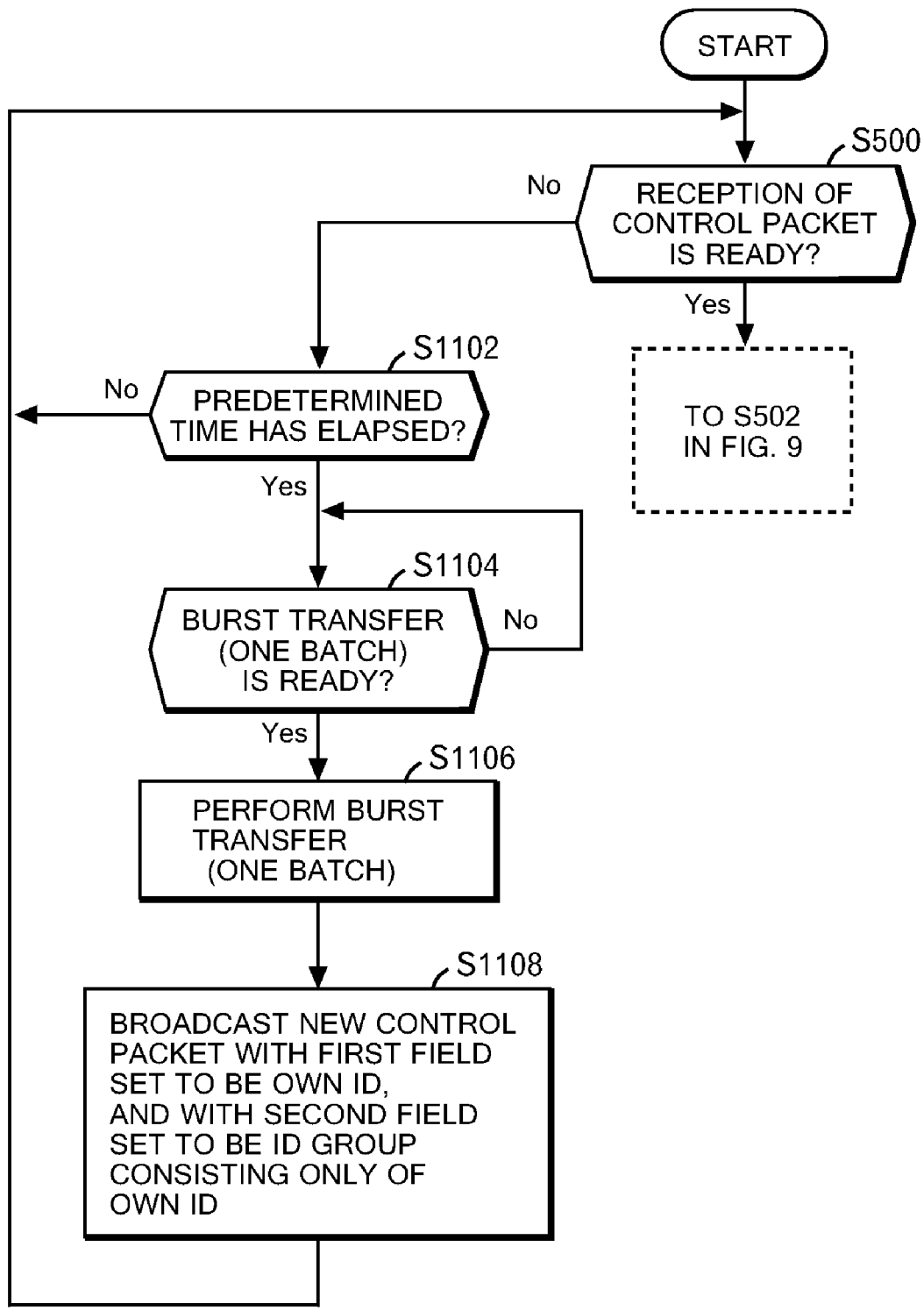
FIG. 11 shows a flow of a procedure according to a fifth embodiment of the present invention in each transmitting apparatus.

FIG. 11 shows a flow of a procedure according to the fifth embodiment of the present invention in each transmitting apparatus.

In the above first to fourth embodiments, a situation where control packets are regularly broadcast is supposed. However, in a case where a transmitting apparatus starts, from the beginning, to operate as an apparatus that performs a burst transfer, there is no apparatus that broadcasts a control packet to this IP network, before the transmitting apparatus starts operating. Hence, if the transmitting apparatus does not receive any control packet within a predetermined time since the start of waiting for a control packet, the transmitting apparatus stops waiting for a control packet as time-out processing, and executes a series of processing steps for performing a burst transfer of data packets. In other words, the transmitting apparatus waits for when burst transfer therefrom becomes ready (step S1102), and actually performs a burst transfer of a batch (step S1104) after the burst transfer has become ready.

After the completion of the burst transfer, the transmitting apparatus broadcasts, to the IP network 400, a fifth new control packet having been generated by the transmitting apparatus itself, as a control packet transmitted at the beginning. Because only this transmitting apparatus is operating as an apparatus that performs a burst transfer to the IP network 400, the ID of the transmitting apparatus itself is stored in a first field in this fifth new control packet, and an ID group consisting only of the ID of its own is stored in a second field therein (step S1108).

After the broadcast of this fifth new packet, the transmitting apparatus returns to the step of waiting for when reception of an additional control packet becomes ready (step S500).

This fifth new control packet having been broadcast is received by the transmitting apparatus itself. In this case, the transmitting apparatus executes a series of processing steps for performing a burst transfer of data packet because the ID of its own is indicated in the first field in the control packet.

After the completion of the burst transfer, an ID is selected from the ID group indicated by the second field. However, the ID of its own is selected again because the ID group consists only of the ID of its own (step S510). Therefore, a new control packet is broadcast with a first field therein being the ID of its own, and with a second field therein including an ID group consisting only of the ID of its own (step S512).

Thus, the transmitting apparatus can repeat a burst transfer in accordance with a control packet transmitted by itself. Here, if a new transmitting apparatus starts to operate as an apparatus that performs a burst transfer, it is possible, on the basis of the above-mentioned fourth embodiment, to have this new transmitting apparatus break in on the group that cyclically performs a burst transfer, and to thereafter repeat a burst transfer alternately between these two transmitting apparatuses.

While the procedures based on the first to fifth embodiments of the present invention have been described above, processing of each of these procedures can be implemented by a combination of functional blocks with which a transmitting apparatus is provided. Hence, those skilled in the technical field of the present invention can perceive the present invention as an apparatus (the entirety of, or a part of, a transmitting apparatus) provided with some functional blocks capable of executing the above described respective procedures.

Figure 12:
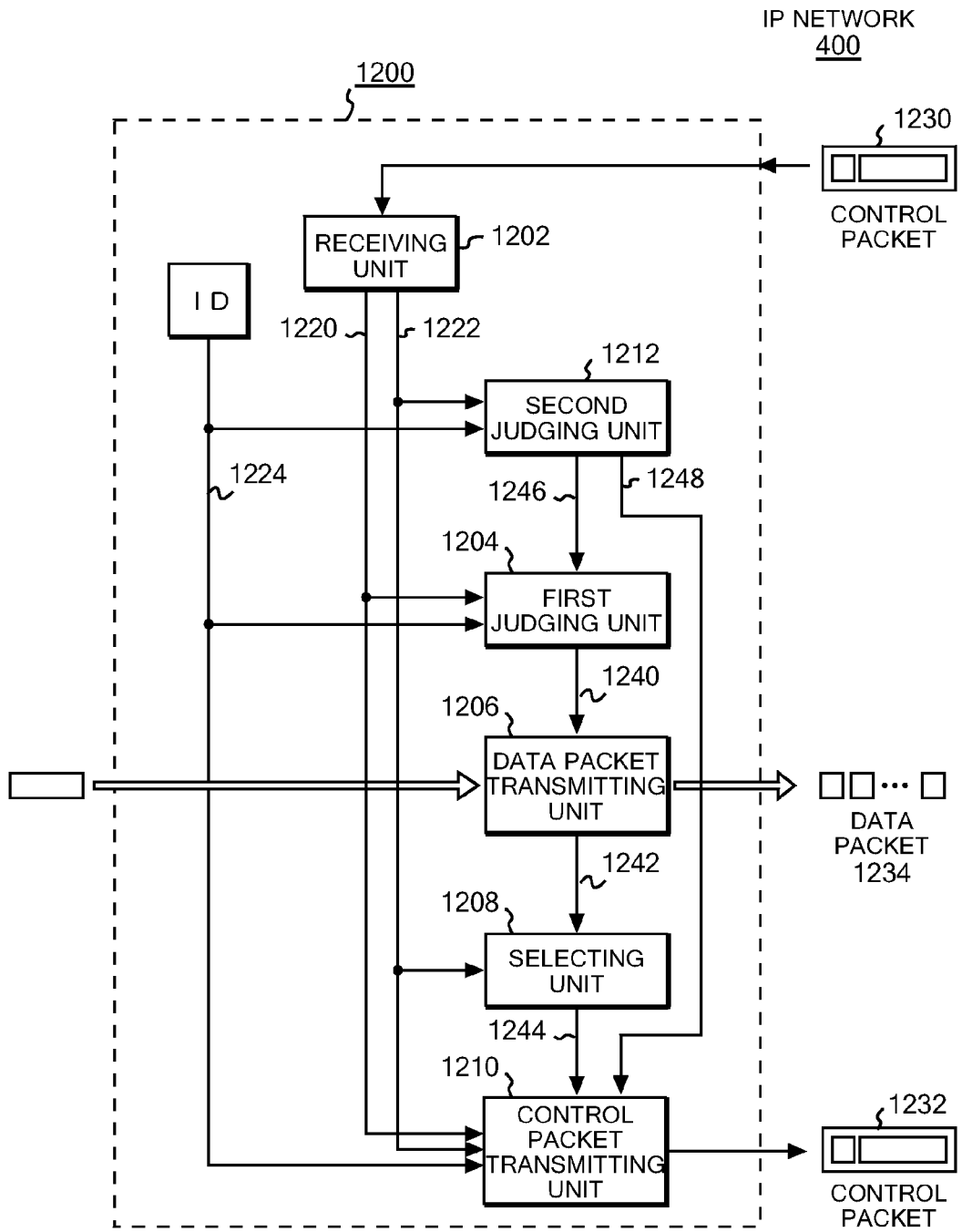
FIG. 12 shows an example of an apparatus consisting of a plurality of functional blocks, and being capable of implementing the present invention.

FIG. 12 shows an example of an apparatus consisting of a plurality of functional blocks and being capable of implementing the present invention. The apparatus 1200 can be perceived as a part of the transmitting apparatus 300 in FIG. 3, or can be considered as the entirety of the transmitting apparatus 300. Representatively, the apparatus 1200 can be configured as an apparatus such as a network adapter composing the external input-output interface 332 in the transmitting apparatus 300.

The apparatus 1200 can be composed as an apparatus provided at least with a receiving unit 1202, a first judging unit 1204, a data packet transmitting unit 1206, a selecting unit 1208 and a control packet transmitting unit 1210.

The receiving unit 1202 has a function of waiting for, and then receiving a control packet broadcast to the IP network 400. As has been described above, this control packet is provided with at least two information fields, a first field and a second field. An ID assigned to any one of transmitting apparatuses connected to the IP network 400 is stored in the first field, and an ID group consisting of an ID or IDs assigned respectively to one or a plurality of transmitting apparatuses connected to the IP network 400 is stored in the second field.

The first judging unit 1204 judges whether the ID indicating the transmitting apparatus 300 is stored in the first field, by comparing a content 1220 of a first field in a control packet 1230 received by the receiving unit 1202 with an ID 1224 indicating the transmitting apparatus 300.

The data packet transmitting unit 1206 transfers a data packet 1234 in bursts from the transmitting apparatus to a corresponding receiving apparatus in response to a judgment 1240 that the ID indicating the transmitting apparatus 300 is stored in the first field.

In response to an event 1242 where burst transfer of one batch is completed, the selecting unit 1208 selects an ID from that group in accordance with a predetermined criterion, such as the round-robin order, by referring to an ID group, which is a content 1222 of a second field in the control packet 1230 received by the receiving unit 1202.

The control packet transmitting unit 1210 generates, and broadcasts, to the IP network 400, a first new control packet 1232 containing at least a first field and a second field. An ID 1244 selected by the selecting unit 1208 is stored in the first field, while the same ID group as stored in that second field is stored the second field in the first new control packet 1232 with reference to an ID group which is the content 1222 of a second field in the most recently received control packet among control packets received by the receiving unit 1202.

The apparatus 1200 can also be composed as an apparatus further provided with a second judging unit 1212.

This second judging unit 1212 judges whether the ID indicating the transmitting apparatus 300 is contained in the ID group stored in the second field, by comparing the ID indicating the transmitting apparatus 300 with an ID group, which is the content 1222 of the second field in the control packet 1230 received by the receiving unit 1202.

Here, only in a case 1246 where the second judging unit 1212 judges that the ID indicating the transmitting apparatus 300 is contained in the ID group stored in the second field, the first judging unit 1204 judges whether the ID indicating the transmitting apparatus 300 is stored in the first field.

Additionally, in a case 1248 where the second judging unit 1212 judges that the ID indicating the transmitting apparatus 300 is not contained in the ID group stored in the second field, the control packet transmitting unit 1210 does not broadcast the first new control packet, but instead, generates, and broadcasts, to the IP network 400, a second new control packet 1232 containing at least a first field and a second field. By referring to an ID, which is the content 1220 of the first field in the control packet 1230 having been received by the receiving unit 1202, the same ID as stored in that first field is stored in the first field in the second new control packet 1232. In the second field in the second new control packet 1232, an ID group updated by adding the ID 1224 of the transmitting apparatus 300 to the ID group, which is the content 1222 of the second field of the control packet 1230 having been received by the receiving unit 1202 is stored.

Furthermore, a computer program, such as application software 324 or the operating system 322, stored in the hard disk drive 318 or the like of the transmitting apparatus 300 in FIG. 3 can enable various components, such as the processor 302, included in the transmitting apparatus 300 to execute the procedure based on any one of the first to fifth embodiments. In other words, the present invention can be perceived as such a computer program that enables the transmitting apparatus 300 to execute the procedure.

Hereinabove, the present invention has been described by using several embodiments. However, the present invention can be implemented in a number of additional different forms, and the above-described embodiments do not limit inventions according to the scope of claims. It is apparent to those skilled in the art that various changes or improvements can be added to the above-mentioned embodiments.

It is also apparent from description of the scope of claims that any embodiments obtained by adding such changes or improvements to the above-mentioned embodiments are also included in the technical scope of the present invention.

Moreover, it should be noted that not all combinations of characteristics described in the above-mentioned are essential for solving means of the invention.

The invention claimed is:

1. A method for transmitting a group of data packets from one of a plurality of transmitting apparatuses through a network to a receiving apparatus corresponding to the transmitting apparatus, comprising:

waiting for and then receiving a control packet broadcasted to the network by another one of the plurality of transmitting apparatuses, the control packet containing a first field and a second field, the first field storing therein an identifier that indicates any one of the plurality of transmitting apparatuses, and the second field storing therein a group of identifiers that indicate all or some of the plurality of transmitting apparatuses;

in response to the reception of the control packet, judging whether an identifier indicating the transmitting apparatus is stored in the first field contained in the control packet, and then, waiting for and then receiving a further control packet if the transmitting apparatus judges that the identifier is not stored therein, or waiting for when the transmitting apparatus becomes ready to transmit a group of data packets, and then transmitting the group of data packets to the corresponding receiving apparatus, if the transmitting apparatus judges that the identifier is stored therein;

in response to a completion of transmitting the group of data packets, selecting one identifier from the group of identifiers stored in the second field, in accordance with a predetermined criterion;

broadcasting a first new control packet to the network, the first new control packet containing a first field and a second field, the first field storing the selected identifier, and the second field storing the group of identifiers; and waiting for and then receiving a further control packet after the completion of broadcasting the first new control packet.

2. The method according to claim 1, further comprising:

broadcasting a second new control packet to the network without broadcasting the first new control packet, if the transmitting apparatus receives an additional control packet between an end of receiving the control packet and the start of broadcasting the first new control packet, the second new control packet containing a first field storing therein the selected identifier, and a second field storing therein a group of identifiers stored in the second field in the additional control packet; and waiting for and then receiving a further control packet after the completion of broadcasting the second new control packet.

3. The method according to claim 2, further comprising:

in response to receiving the control packet, judging whether the identifier indicating the transmitting apparatus is included in the group of identifiers stored in the second field, before judging whether the identifier indicating the transmitting apparatus is stored in the first field, and then, judging whether the identifier indicating the transmitting apparatus is stored in the first field if the transmitting apparatus judges that the identifier is included therein, or broadcasting a third new control packet to the network if the transmitting apparatus judges that the identifier is not thus included, the third new control packet containing a first field storing therein the identifier stored in the first field in the received control packet, and a second field storing therein an updated group of identifiers obtained by adding the identifier of the transmitting apparatus to the foregoing group of identifiers; and waiting for and then receiving a further control packet after the completion of broadcasting the third new control packet.

4. The method according to claim 1, wherein transmitting the group of data packets includes selecting the identifier from the group of identifiers stored in the second field, if the transmission does not become ready within a predetermined time since the start of waiting for when the transmission becomes ready.

5. The method according to claim 3, further comprising:

judging whether the transmitting apparatus is allowed to transmit any group of data packets, before transmission of the group of data packets becomes ready, if the transmitting apparatus judges that the identifier indicating the transmitting apparatus is stored in the first field in the received control packet, and then, transmitting a group of data packets to a corresponding receiving apparatus after waiting for when transmission of the group of data packets becomes ready, if the transmitting apparatus judges that the transmitting apparatus is allowed to transmit any group of data packets, or selecting one identifier from the group of identifiers stored in the second field, in accordance with a predetermined criterion, if the transmitting apparatus judges that the transmitting apparatus is not allowed to transmit any group of data packets; and in response to selecting the identifier, broadcasting a fourth new control packet to the network, the fourth new control packet containing a first field storing therein the selected identifier, and a second field storing therein an updated group of identifiers obtained by excluding the identifier of the transmitting apparatus from the foregoing group of identifiers.

6. The method according to claim 1, wherein receiving the control packet includes waiting for when transmission of a group of data packets from the transmitting apparatus becomes ready, and then transmitting the group of data packets to the corresponding receiving apparatus, if the transmitting apparatus does not receive any control packet within a predetermined time since the start of waiting for a control packet, the method further comprising:

in response to completion of transmitting the group of data packets, broadcasting a fifth new control packet to the network, the fifth new control packet containing a first field storing therein the identifier of the transmitting apparatus, and a second field storing therein a group of identifiers consisting only of the identifier of the transmitting apparatus; and waiting for and then receiving a further control packet after the completion of broadcasting of the fifth new control packet.

7. The method according to claim 1, wherein, selecting one identifier in accordance with a predetermined criterion includes, selecting an identifier placed next to the identifier associated with the transmitting apparatus if the identifier associated with the transmitting apparatus is not placed at the end of the group of identifiers; or selecting an identifier placed at the beginning of the group of identifiers if the identifier associated with the transmitting apparatus is placed at the end of the group of identifiers.

8. The method according to claim 1, wherein the identifiers are uniquely assigned respectively to the plurality of transmitting apparatuses.

9. The method according to claim 8, wherein:

the network is an IP network;

the transmission of a group of data packets includes burst transfer of the group of data packets; and the identifiers respectively include IP addresses assigned to the transmitting apparatuses connected to the IP network.

10. A transmitting apparatus, comprising one of a plurality of transmitting apparatuses connected to a network, and which transmits a group of data packets through the network to a corresponding receiving apparatus, the transmitting apparatus comprising:

a receiving unit for waiting for and then receiving a control packet to the network, the control packet containing a first field storing therein an identifier indicating any one of the plurality of transmitting apparatuses, and a second field storing therein a group of identifiers associated with all or some of the plurality of the transmitting apparatuses;

a first judgment unit for judging whether an identifier indicating the transmitting apparatus is stored in the first field, by comparing the first field in the control packet received by the receiving unit with the identifier indicating the transmitting apparatus;

a data packet transmitting unit for transmitting a group of data packets from the transmitting apparatus to the corresponding receiving apparatus in response to judging that the identifier indicating the transmitting apparatus is stored in the first field;

a selecting unit for selecting, in response to completion of transmitting the group of data packets, one identifier from the group of identifiers stored in the second field of the control packet, in accordance with a predetermined criterion; and a control packet transmitting unit for broadcasting a first new control packet to the network, the first new control packet containing a first field storing therein the selected identifier, and a second field storing therein a group of identifiers stored in a control packet received most recently by the receiving unit.

11. The transmitting apparatus according to claim 10, further comprising a second judging unit for judging whether the identifier indicating the transmitting apparatus is included in the group of identifiers stored in the second field, by comparing the second field in the control packet received by the receiving unit, with the identifier indicating the transmitting apparatus, wherein:

only if the second judging unit judges that the identifier indicating the transmitting apparatus is included in the group of identifiers stored in the second field, the first judging unit judges whether the identifier indicating the transmitting apparatus is stored in the first field; and, if the second judging unit judges that the identifier indicating the transmitting apparatus is not included in the group of identifiers stored in the second field, the control packet transmitting unit broadcasts a second new control packet to the network without broadcasting the first new control packet, the second new control packet containing a first field storing therein the identifier stored in the first field in the control packet received by the receiving unit, and a second field storing therein an updated group of identifiers obtained by adding the identifier of the transmitting apparatus to the group of identifiers stored in the second field in the control packet received by the receiving unit.

12. A computer program comprising a computer program code stored in a non-transitory computer readable storage medium in a transmitting apparatus of a plurality of transmitting apparatuses connected to a network, the computer program being for enabling the transmitting apparatus to transmit a group of data packets through the network to a corresponding receiving apparatus, the computer program causing the transmitting apparatus to perform the steps of:

waiting for and then receiving a control packet which is broadcast from one of the plurality of transmitting apparatuses to the network, and which contains a first field storing therein an identifier indicating any one of the plurality of transmitting apparatuses, and a second field storing a group of identifiers indicating all or some of the plurality of the transmitting apparatuses;

in response to receiving the control packet, judging whether an identifier indicating the transmitting apparatus is stored in the first field in the control packet, and then, waiting for and then receiving a further control packet if it is judged that the identifier is not stored therein, or waiting for when transmission of a group of data packets from the transmitting apparatus becomes ready, and then transmitting the group of data packets to the corresponding receiving apparatus, if it is judged that the identifier is stored therein;

in response to completion of transmitting the group of data packets, selecting one identifier from the group of identifiers stored in the second field, in accordance with a predetermined criterion;

in response to selecting the identifier, broadcasting a first new control packet to the network, the first new control packet containing a first field storing therein the selected identifier, and a second field storing therein the group of identifiers; and waiting for and then receiving a further control packet after the completion of broadcasting the first new control packet.

13. The computer program according to claim 12, causing the transmitting apparatus to further perform the steps of:

broadcasting a second new control packet to the network without broadcasting the first new control packet if the transmitting apparatus receives an additional control packet between the end of receiving the control packet and the start of broadcasting the first new control packet, the second new control packet containing a first field storing therein the selected identifier, and a second field storing therein a group of identifiers stored in a second field of the additional control packet; and waiting for and then receiving a further control packet after the completion of broadcasting the second new control packet.

14. The computer program according to claim 13, causing the transmitting apparatus to further perform the steps of:

in response to receiving the control packet, judging whether the identifier indicating the transmitting apparatus is included in the group of identifiers stored in the second field, before judging whether the identifier indicating the transmitting apparatus is stored in the first field, and then, judging whether the identifier indicating the transmitting apparatus is stored in the first field, if it is judged that the identifier is thus included, or broadcasting a third new control packet to the network, the third new control packet containing a first field storing therein the identifier stored in the first field in the control packet, and a second field storing therein an updated group of identifiers obtained by adding the identifier of the transmitting apparatus to the group of identifiers, if it is judged that the identifier is not thus included; and waiting for and then receiving a further control packet after the completion of broadcasting the third new control packet.

* * * * *